April 20, 1965  R. D. RUMSEY  3,179,018
HYDRAULIC ROTARY ACTUATOR WITH LOCKING MEANS
Filed Oct. 23, 1962  2 Sheets-Sheet 1

INVENTOR.
Rollin Douglas Rumsey
BY
ATTORNEYS

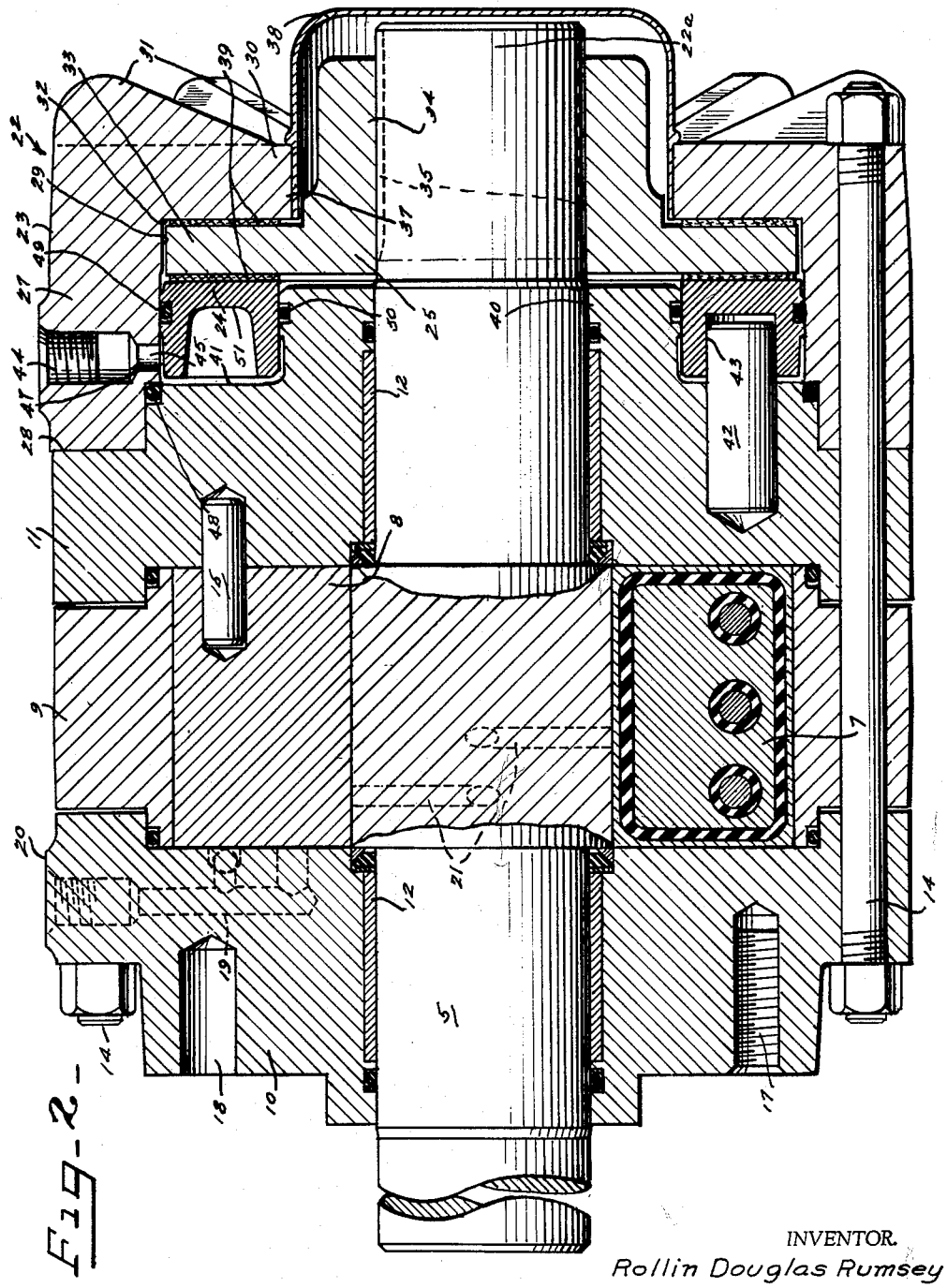

United States Patent Office 3,179,018
Patented Apr. 20, 1965

3,179,018
HYDRAULIC ROTARY ACTUATOR WITH LOCKING MEANS
Rollin Douglas Rumsey, Buffalo, N.Y., assignor to Houdaille Industries, Inc., Buffalo, N.Y., a corporation of Michigan
Filed Oct. 23, 1962, Ser. No. 232,513
7 Claims. (Cl. 92—28)

Hydraulic rotary actuators are extremely useful devices for the positioning of booms on backhoes, derricks, earth augers, aerial towers and similar industrial and other machinery, as well as on farming machinery such as tractor drawn turnover plows, mining and drilling machines, and the like. In mobile equipment and in apparatus developing torque such as drills, drift or movement of the boom or other apparatus movably connected through the rotary actuator often results because of inherent internal leakage in the actuator. Therefore, severe limitation upon the utilization of such actuators has been the rule, although their use would be highly desirable by virtue of installation simplicity, compact size, ease of design, operational versatility, etc.

Heretofore, efforts to eliminate the problem of drift and movement have been in the direction of avoiding leakage in this type of actuator. Even though much progress has been made in this direction, complete elimination of internal leakage from chamber-to-chamber has not been attained, and does not seem to be attainable within practical operating tolerance requirements.

According to the present invention, a locking device capable of positively preventing drift or slippage under loads up to full torque has been provided.

Among other objects and features of the invention is the provision of a novel locking device for hydraulic rotary actuators which is capable of locking in any position infinitely throughout 360°, or at least throughout the operating range of the actuator.

Another object of the invention is to provide a new and improved hydraulically actuated friction brake for hydraulic rotary actuators characterized by extreme compactness and high efficiency.

A further object of the invention is to provide locking means for hydraulic rotary actuators of simple rugged and low cost construction.

Still another object of the invention is to provide a new and improved locking device for hydraulic rotary actuators of high static holding power.

Yet another object of the invention is to provide a new and improved hydraulic braking system for hydraulic rotary actuators which comprises an integral part of the actuator itself.

Other objects, features and advantages of the present invention will be readily apparent from the following detailed description of certain preferred embodiments thereof taken in conjunction with the accompanying drawings, in which:

FIGURE 2 is a longitudinal sectional view taken substantially on the line II—II of FIGURE 1.

Figure 1:
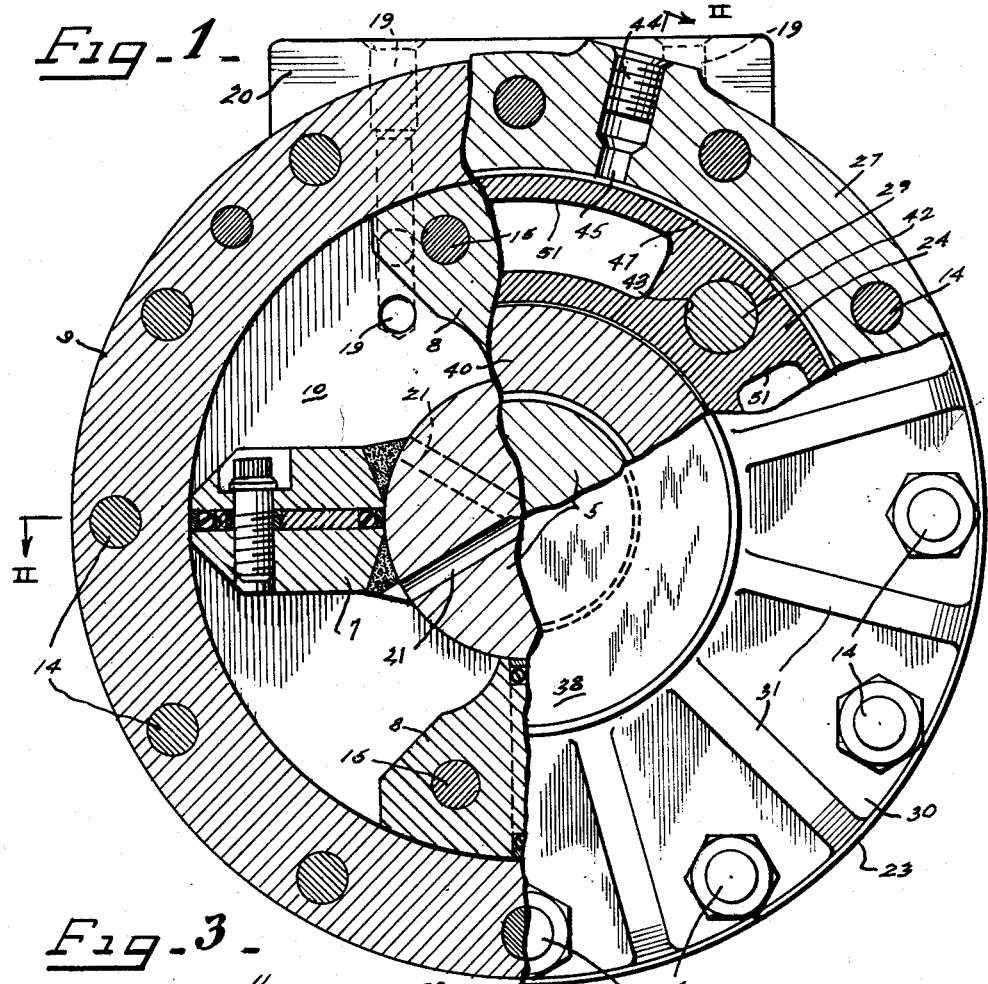
FIGURE 1 is an end view of a rotary actuator embodying features of the present invention, and showing the same partially in end elevation and partially in break-away sections for illustrative purposes.
Figure 3:
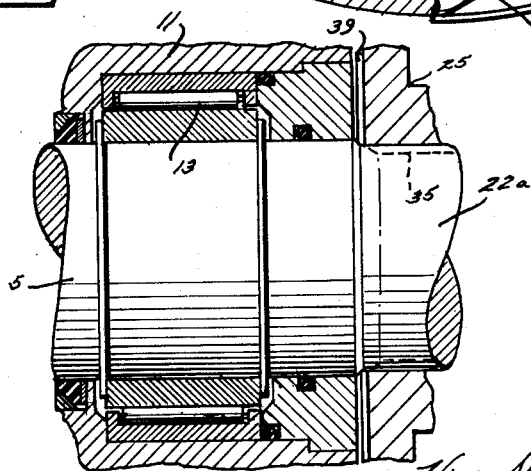
FIGURE 3 is a fragmentary longitudinal sectional view showing a modified bearing assembly for the actuator.

In FIGURES 1 and 2, the invention has been illustrated as embodied in a typical hydraulic rotary actuator including a wing shaft 5 having one or more, in this instance two, vanes 7 oscillatably operable in the usual manner between abutments 8 in an operating chamber within a housing comprising a housing body ring 9 and opposite end closures or cover members 10 and 11 which are centrally bored and carry suitable bearings for the opposite end portions of the wing shaft 5 suchas bushings 12 as shown in FIGURE 2 or anti-friction bearings exemplified by roller bearings 13 in FIGURE 3. The usual and desirable O-ring or other seals against hydraulic fluid leakage are provided where necessary or preferred, substantially as shown. Means for securing the housing components together in axial alignment comprise suitable bolts 14. Anchoring of the abutments 8 is effected by suitable means such as dowels 15.

One of the end cover members, herein the member 10, may be equipped to be secured to the supporting structure of the apparatus to which the actuator is mounted operatively. For this purpose the end cover member 10 may be provided with threaded bolt holes 17 and dowel holes 18 opening from its external end. In addition, the end cover member 10 may be provided with suitable means affording hydraulic fluid passages 19 opening at their inner ends into the actuating vane chambers at opposite sides of one of the abutments 8 and opening at their outer ends through an attachment boss structure 20 receptive of suitable hydraulic nipples or other connectors by which hydraulic fluid ducts from the hydraulic control system (not shown) of the associated machine are attached. Transmission of hydraulic fluid pressure and, alternatively, displacement of hydraulic fluid between the respective subchambers of the operating chamber for each of the vanes 7 is accomplished in the usual manner through respective cross bores 21 in the wing shaft 5. Through this arrangement, rotary actuation of the wing shaft 5 within the actuator housing motivates a movable component of the associated equipment to which an end portion of the wing shaft 5 projecting from the housing, in this instance externally of the cover member 10, is operatively connected.

As an integral part of the rotary actuator, means are provided for hydraulically locking the wing shaft 5 and the housing against relative rotation for holding the component of the associated equipment motivationally connected to the wing shaft 5 in any position to which it may have been moved relative to the equipment by actuation of the actuator. To this end, a simple, compact hydraulic braking system has been provided comprising mechanism 22 associated with the end cover member 11 and an end portion 22a of the wing shaft 5 which projects externally of this end cover. Three principal rugged elements or components comprise the brake mechanism 22, namely, an auxiliary cap or housing part 23, an annular ring plate piston member 24, and a brake disk flange member 25.

Mounting of the auxiliary cap housing member 23 in fixed coaxial alignment upon the end cover member 11 is facilitated by engagement of an axial flange portion 27 thereof within an external end, outer marginal rabbet 28 in the cover member. In this relationship, attachment is effected by means of the bolts 14 which are of sufficient number and length to maintain all of the housing parts clamped into an integral stack fully resistant to all internal pressures. Within the cap member 23 is a braking chamber 29 defined circumferentially by the flange portion 27 and on the axially outer end by a radially inwardly extending outer end flange 30 of the cap member which, for maximum strength with minimum weight, is provided with a uniform series of axially projecting and radially extending reinforcing ribs 31.

Within the brake chamber 29, the cap end flange 30 has an axially inwardly facing surface 32 spaced from the end of the housing end member 11 sufficiently to accommodate a brake disk flange 33 of the brake member 25 which has its radially outer perimeter in adjacent spaced relation to the inside diameter of the cap member axial flange 27 defining the brake chamber 29. Projecting from the radially inner margin of the flange 33 is an axially outwardly extending tubular hub flange 34 which is axially slidably mounted on the wing shaft end extension portion 22a and held positively corotative therewith by means such as complementary splines 35. An axial bore 37 through the cap member flange 30 affords free clearance for projection therethrough of the hub flange 34, and a dust cover 38 is secured as by press fitting it into the bore 37 to exclude foreign material from the working area within the cap 23.

Operation of the brake is effected by driving the brake disk flange 33 into positive friction gripping engagement against the brake cap flange surface 32 which thereby locks the wing shaft 5 against rotation relative to the actuator housing. Frictional resistance to relative movement of the braking surfaces, when the brake is set, is enhanced by providing between the braking surfaces suitable brake linings 39 which may conveniently be secured to the opposite faces of the brake flange 33. Suitable material for the brake linings 39, depending on pressure, torque, etc., comprise a resin impregnated cork type which has a high coefficient of friction either dry or oily, a sintered metal type, a nylon type, and the like. The brake linings may be suitably secured to the flange 33 by cementing or other suitable means.

Releasable braking pressure against the brake flange 33 is applied by the brake piston 24 which, for this purpose, is of such construction and arrangement as to be reciprocable within an annular piston channel cylinder pressure area, opposing and spaced from the circumferentially continuous braking surface 32 which is disposed radially about the diameter of the wing shaft 5, in the brake chamber 29, to thrust in braking relation toward the brake disk flange 33 and back away therefrom when the brake is to be released. Accordingly, in its outer diameter the brake piston 24 is slidably guided by the encompassing inside diameter cylindrical surface of the cap flange 27 defining the chamber 29. On its inside diameter, the brake piston 24 is reciprocably guided by a cylindrical hub 40 of the end member 11 defining a brake chamber cylinder rabbet 41 within which the piston is accommodated.

In order to distribute the braking torque to the end member 11 as well as the brake cap 23, the piston 24 is held against rotation relative to the end member 11, but is permitted free axial braking reciprocation, by means of dowel pins 42 which are anchored in the end member 11 and project from the axial face of the rabbet 41 into slidable engagement with in blind end socket bores 43 opening rearwardly from the piston. In a two vane actuator, as illustrated, there may be four of torque dowels 42 for amply withstanding the relatively large torques encountered in an actuator unit of this size. In a smaller unit utilizing a single actuating vane a smaller number such as two torque dowels or pins will suffice. Through this arrangement, resistance to turning of the brake disk 25 and thereby holding of the vane shaft 5 against turning is afforded not only by the frictional interengagement of the brake disk flange 33 with the cap flange 30 but also with the piston 24 thrusting clampingly thereagainst and held positively against turning by the dowel pins 47 anchored in the housing end member 11.

Hydraulic actuation of the brake piston 24 is effected by hydraulic pressure introduced behind the piston through a suitable hydraulic conduit (not shown) connected into a threaded nipple bore 44 opening from the cap flange 27 and communicating with a port 45 leading into the rear end portion of the brake piston cylinder chamber 29 and into a clearance afforded about the outside diameter of the rear portion of the piston 24 by an annular insetting clearance groove 47 in the adjacent outer perimeter of the piston. Seals against leakage of pressure fluid from the pressure area at the rear of the piston cylinder are afforded by an O-ring seal 48 in the joint between the flange 27 and the housing end member 11, by an O-ring seal 49 in the outside perimeter of the piston, and by an O-ring seal ring 50 in the cylindrical surface of the hub 40 opposing the piston.

In order to afford ample length in the ipston 24 to accommodate the torque dowel sockets 43 while maintaining weight at a minimum, pressure pockets 51 are recessed in the rear face of the piston 24 between land areas within which the sockets 43 are formed. These pressure pockets 51 are circumferentially elongated and have the sides provided with substantial draft as best seen in FIGURE 2.

In operation, the actuator locking or braking unit 22 functions, while hydraulic pressure acts upon the piston 24, to hold the wing shaft 5 positively against rotation relative to the actuator housing in spite of any torque forces that may be imposed on the wing shaft in the static condition of the actuator. When the actuator is to be operated to drive the wing shaft 5 rotatably relative to the housing, the brake is released by relieving the pressure in the pressure area behind the piston 24 so that it backs off relative to the brake disk flange 33 whereby the brake disk member 25 can rotate freely with the wing shaft 5. In such release of the brake, the disk flange 33 also backs away from the braking surface 32. As shown in FIG. 2, substantial clearance is afforded for brake-releasing movement of the disk flange 33 in the chamber 29 because the flange is thinner than the distance between the surface 32 and the adjacent end of the cover 11. Further, the combined thickness of the brake piston 24 and the flange 33 is less than the combined distance between the surface 33 and the axial face of the rabbet 41. In the braking position of the piston 24 a clearance is afforded between the ends of the pins 42 and the blind ends of the socket bores 43, so that the piston has ample back-off reciprocation space.

Any preferred correlation of the hydraulic controls for the actuator and for the actuator brake can be afforded in the particular apparatus with which the actuator is employed. For example, the relationship in a typical boom type installation could be in the form of continuous application of hydraulic pressure to the actuator lock port 45 until desired to position the boom, at which time full power could be delivered to the actuator through the selected pressure passage 19, followed by relieving the pressure to the locking brake unit, and reapplying pressure to the locking brake unit when the boom has reached the desired position, in turn followed by cutting off the actuator pressure. Under conditions of relatively level terrain, the actuator brake lock could be relieved prior to application of the actuator actuation power and reapplied after the new position is reached and the actuator shut off, in order to converse wear on the friction surfaces provided by the brake linings 39. Either of such operations could be performed at the discretion of the machine operator. Alternatively, it would be possible to utilize a four-way control valve with an extra spool annulus which will automatically shut off brake pressure as the valve is opened one way or the other. These examples will indicate the versatility of the present brake arrangement.

It may also be noted that the rotary actuator brake arrangement of the present invention is capable of extremely high loading. For example, in a practical installation a surface loading of over three thousand pounds per square inch on the friction surfaces afforded by the brake linings 39 is normally attainable. This contrasts greatly, of course, with ordinary industrial brakes which are generally limited to about two hundred p.s.i. and high speed brakes which operate in a range of about ten to fifty p.s.i.

It will be understood that modifications and variations may be effected without departing from the scope of the novel concepts of the present invention.

I claim as my invention:

1. In a rotary hydraulic actuator including a housing having therein an operating chamber with the usual abutment and means for introduction of hydraulic fluid and a wing shaft rotatably mounted in said housing and having a vane in said operating chamber oscillatably responsive to fluid pressure for actuating the wing shaft, and selectively operable means for statically locking the wing shaft and housing positively against relative torque displacement including:

means comprising rigid structure of the housing defining a brake chamber including an axially facing circumferentially continuous braking surface radially about the diameter of the wing shaft and an annular piston channel cylinder defining a pressure area portion of the brake chamber opposing and spaced from said surface, an annular piston reciprocably mounted in said channel cylinder, a brake disk flange corotatively attached to said shaft and interposed between said surface and said piston, and means for introducing hydraulic pressure fluid into said channel cylinder behind said piston to drive the piston into braking thrust relation to said flange for thereby clamping it in braking relation against said surface.

2. In a rotary hydraulic actuator including a housing having therein a wing shaft chamber with the usual abutment and means for introduction of hydraulic fluid and a wing shaft rotatably mounted in said housing and having a vane in said operating chamber oscillatably responsive to fluid pressure for actuating the wing shaft, and selectively operable means for statically locking the wing shaft and housing positively against relative torque displacement including:

means comprising rigid structure of the housing defining a brake chamber including an axially facing circumferentially continuous braking surface radially about the diameter of the wing shaft and an annular piston channel cylinder defining a pressure area portion of the brake chamber opposing and spaced from said surface, an annular piston reciprocably mounted in said channel cylinder, a brake disk flange corotatively attached to said shaft and interposed between said surface and said piston, means for introducing hydraulic pressure fluid into said channel cylinder behind said piston to drive the piston into braking thrust relation to said flange for thereby clamping it in brake-setting relation against said surface, said piston having rearwardly opening dowel pin sockets at circumferentially spaced intervals, and dowel pins anchored in said housing and extending into said sockets and thereby retaining the piston against torque displacement relative to the housing so that the piston coacts with said surface in locking the flange and thereby the shaft to the housing during a brake-setting action of the piston.

3. In a hydraulic rotary actuator including a wing shaft rotatably mounted in a housing comprising stacked ring body and opposite end members secured rigidly together in coaxial relation, said end members carrying coaxial bearings and the wing shaft being journalled in said bearings, one end portion of the shaft extending externally of one of the end members, a generally cup-shaped auxiliary housing part cap having an axial flange fixedly secured to said one end member and defining with the external end of said end member a brake chamber encircling said one end portion of the shaft, said cap having within said brake chamber a braking surface facing toward said end member, an axially slidable corotatively attached brake disk flange on said one end portion of the shaft and extending into said chamber in opposition to said braking surface, and means mounted on said end member and operative in said chamber to thrust said flange brakingly against said surface.

4. In a hydraulic rotary actuator including a wing shaft rotatably mounted in a housing comprising a body having at least one end member rigidly secured thereto in coaxial relation, said end member providing a bearing through which the wing shaft is journalled and beyond which the wing shaft extends, a generally cup-shaped auxiliary housing cap fixedly secured to said one end member and defining with the external end of said end member a brake chamber encircling the projecting portion of the shaft, said cap having within said brake chamber a braking surface facing toward said end member, an axially reciprocably corotatively attached brake flange on said projecting portion of the shaft and extending radially into said chamber in opposition to said braking surface, said end member having thereon a hub projecting toward said flange, and a ring shaped braking member movable on said hub to thrust said flange brakingly against said surface.

5. In a hydraulic rotary actuator including a wing shaft rotatably mounted in a housing comprising a body having at least one end member rigidly secured thereto in coaxial relation, said end member providing a bearing through which the wing shaft is journalled and beyond which the wing shaft extends, a generally cup-shaped auxiliary housing cap fixedly secured to said one end member and defining with the external end of said end member a brake chamber encircling the projecting portion of the shaft, said cap having within said brake chamber a braking surface facing toward said end member, an axially reciprocably corotatively attached brake disk flange on said projecting portion of the shaft and extending radially into said chamber in opposition to said braking surface, said end member having a recess therein opening toward said flange, and thrust means mounted in said recess and operable to thrust said flange brakingly against said surface.

6. In a rotary actuator including a housing and a shaft relatively rotatably mounted in said housing, one end portion of the housing including an end member having a bore therethrough and through which the shaft is journalled with a portion extending beyond said end member, a generally cup-shaped auxiliary housing cap having an axial flange fixedly secured to said end member and defining therewith a brake chamber encircling said extending portion of the shaft, said cap having within said brake chamber a braking surface facing toward said end member, a rabbet in said end member opening toward said surface and toward said axial flange, a thrust member slidably reciprocably guided by said flange and said end member within said rabbet, means for selectively applying pressure to said thrust member within said rabbet to drive it toward said surface, means for maintaining said thrust member against torsional movement relative to said end member, and a brake disk corotatively mounted for axial reciprocation on said extending portion of the shaft and having a flange portion extending radially into position between said surface and said thrust member and being adapted to be brakingly thrust by said thrust member against said surface.

7. A rotary actuator as defined in claim 6, wherein said cap has a bore substantially larger than said extending portion of the shaft, said axially reciprocable disk having a hub projecting through said bore, and a dust cap removably disposed over said extending shaft end portion and said hub and engaged with said auxiliary housing cap in said bore.

References Cited by the Examiner

UNITED STATES PATENTS

| 2,741,702 | 4/56 | Keen | 192—3 |
| 2,893,519 | 7/59 | Martin | 188—71 |
| 3,017,807 | 1/62 | Grover | 192—3 |
| 3,038,564 | 6/62 | Lee et al. | 188—71 |

KARL J. ALBRECHT, *Acting Primary Examiner.*
RICHARD WILKINSON, *Examiner.*